United States Patent
Burroughs et al.

(10) Patent No.: US 10,064,387 B2
(45) Date of Patent: Sep. 4, 2018

(54) SQUEEZABLE WATER BOTTLE FOR PETS WITH ATTACHED BOWL

(71) Applicants: Sheila Ann Burroughs, Chino, CA (US); Ethan Daniel Burroughs, Chino, CA (US); Preston Brooks Burroughs, Chino, CA (US)

(72) Inventors: Sheila Ann Burroughs, Chino, CA (US); Ethan Daniel Burroughs, Chino, CA (US); Preston Brooks Burroughs, Chino, CA (US)

( * ) Notice: Subject to any disclaimer, the term of this patent is extended or adjusted under 35 U.S.C. 154(b) by 255 days.

(21) Appl. No.: 15/187,351

(22) Filed: Jun. 20, 2016

(65) Prior Publication Data

US 2016/0366852 A1    Dec. 22, 2016

Related U.S. Application Data

(60) Provisional application No. 62/181,287, filed on Jun. 18, 2015.

(51) Int. Cl.
| | | |
|---|---|---|
| *A01K 7/00* | (2006.01) | |
| *B65D 1/32* | (2006.01) | |
| *B65D 41/26* | (2006.01) | |
| *B65D 47/24* | (2006.01) | |

(52) U.S. Cl.
CPC .................. *A01K 7/00* (2013.01); *B65D 1/32* (2013.01); *B65D 41/26* (2013.01); *B65D 47/247* (2013.01)

(58) Field of Classification Search
CPC ...... A01K 7/00; A01K 39/02; A01K 39/0213; A01K 5/0114; A01K 5/0135; A01K 7/005; A01K 7/02; B65D 21/0238; B65D 2517/0049; B65D 2543/00046; B65D 41/26; B65D 81/3211
USPC ........... 119/61.54, 72, 74, 75; 222/207, 492; D30/129, 132, 121; 220/212, 23.83, 709
See application file for complete search history.

(56) References Cited

U.S. PATENT DOCUMENTS

| | | | | |
|---|---|---|---|---|
| 2,203,476 A * | 6/1940 | Trabold | ................. | B65D 23/00 220/717 |
| 3,246,807 A * | 4/1966 | Micallef | ............... | G01F 11/286 222/207 |
| 4,106,673 A * | 8/1978 | Donoghue | ............ | G01F 11/286 222/207 |
| 5,070,817 A * | 12/1991 | Momont | ................ | A01K 39/02 119/75 |
| 5,628,276 A * | 5/1997 | Raposa | ................ | A01K 5/0114 119/61.54 |
| 5,809,935 A * | 9/1998 | Kolterman | ............... | A01K 7/02 119/74 |
| D400,316 S * | 10/1998 | Kolterman | ................... | D30/132 |
| 7,549,395 B2 * | 6/2009 | Stenberg | ................. | A01K 7/02 119/74 |
| 8,485,378 B2 * | 7/2013 | Zoss | ..................... | A47G 19/02 206/219 |
| 8,807,083 B1 * | 8/2014 | Ross | ....................... | A01K 7/00 119/72 |

(Continued)

*Primary Examiner* — Yvonne R Abbott-Lewis
(74) *Attorney, Agent, or Firm* — Dunlap Bennett & Ludwig PLLC; Brendan E. Squire

(57) ABSTRACT

A one handed squeezable water bottle for pets with an attached water bowl on top. The invention can be used for one hand dispensing of water for a pet. The bowl is adapted to contain a remaining volume of water for the pet to drink when the user releases pressure from the reservoir carrying the water.

12 Claims, 4 Drawing Sheets

(56) References Cited

U.S. PATENT DOCUMENTS

| | | | |
|---|---|---|---|
| 8,807,372 B2* | 8/2014 | Kao | B65D 21/0238 |
| | | | 215/319 |
| D741,025 S * | 10/2015 | Ross | D30/121 |
| 9,884,700 B2* | 2/2018 | Kao | B65D 15/08 |
| 9,901,073 B2* | 2/2018 | Hunt | A01K 7/00 |
| 2002/0066677 A1* | 6/2002 | Moscovitz | B65D 51/2835 |
| | | | 206/219 |
| 2008/0115732 A1 | 5/2008 | Stenberg | |
| 2009/0065377 A1* | 3/2009 | Olomi | B65D 41/26 |
| | | | 206/217 |
| 2012/0017837 A1* | 1/2012 | Crawford | A01K 5/01 |
| | | | 119/61.1 |
| 2015/0298867 A1* | 10/2015 | Sanderson | A01K 7/00 |
| | | | 215/6 |
| 2016/0050884 A1 | 2/2016 | Ross | |

\* cited by examiner

US 10,064,387 B2

SQUEEZABLE WATER BOTTLE FOR PETS WITH ATTACHED BOWL

CROSS-REFERENCE TO RELATED APPLICATION

This application claims the benefit of priority of U.S. provisional application No. 62/181,287, filed Jun. 18, 2015 the contents of which are herein incorporated by reference.

BACKGROUND OF THE INVENTION

The present invention relates pet care items, and more particularly to a water dispensing apparatus for pets.

Currently, there are various watering apparatus for providing water to pets while the pet owner is on the go without finding a place to set down a bowl. These various other watering bottles leak, break and waste water. Some of these pet watering devices require the pet owner to apply a pressure to the water vessel in order for water to be retained in the bowl.

As can be seen, there is a need for a pet hydrating apparatus can be used with one hand and also permits hands free retention of a remaining volume of hydrating fluid for the pet to consume.

SUMMARY OF THE INVENTION

In one aspect of the present invention, a pet hydrating apparatus, includes: a liquid containment reservoir having a throat portion at a top end of the reservoir; a bowl having top portion with an upwardly formed diverging sidewall and an arcuate bottom wall adapted to contain a remaining volume of hydrating fluid therein, a bottom portion adapted for sealing engagement with the throat portion; and a spout defined in the arcuate bottom wall, in fluid communication with a bottom portion of the reservoir via a straw. The hydrating apparatus may also include a valve adapted for cooperative engagement with the spout and operable between a closed liquid containing position and an open liquid conveying position.

The valve may have an outer body, an interior cavity; and a plurality of slots extending from the interior cavity and the outer body, the slots defined by a plurality of tabs extending downwardly from the outer body. The interior cavity of the valve may be carried on a post extending upwardly from a central portion of the spout. The tabs may have a lip configured for cooperative engagement with a bottom surface of the spout to retain the valve in a closed position. The spout has an annular rim defined in an interior surface of the spout cooperative engagement with the valve lip to retain the valve in an open position within the spout.

In some embodiments, an upper opening of the spout is elevated with respect to an upper surface of the arcuate bottom wall within the bowl. The reservoir is formed of a resilient material.

Other aspects of the present invention include a pet hydration method, which includes the steps of:

Providing a pet hydrating apparatus, having a liquid containment reservoir having a throat portion at a top end of the reservoir; a bowl having top portion with an upwardly formed diverging sidewall and an arcuate bottom wall adapted to contain a remaining volume of hydrating fluid therein, a bottom portion adapted for sealing engagement with the throat portion; and a spout defined in the arcuate bottom wall that is in fluid communication with a bottom portion of the reservoir via a straw. The method includes the step of filling the reservoir with a hydration fluid.

When desired to hydrate the pet, the method includes squeezing to apply a pressure to the reservoir to at least partially fill the bowl with the hydration fluid. The method may also include presenting the bowl to the pet to drink. In other aspects of the method, the user may release the pressure applied to the reservoir, such that the remaining volume of hydrating fluid is available for the pet to drink.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a self-contained pet hydration apparatus having a bottle shaped reservoir portion to contain a volume of hydration fluid and a bowl shaped top portion from which the pet can drink a volume of hydration fluid conveyed to the bowl shaped portion.

Figures 1, 2:
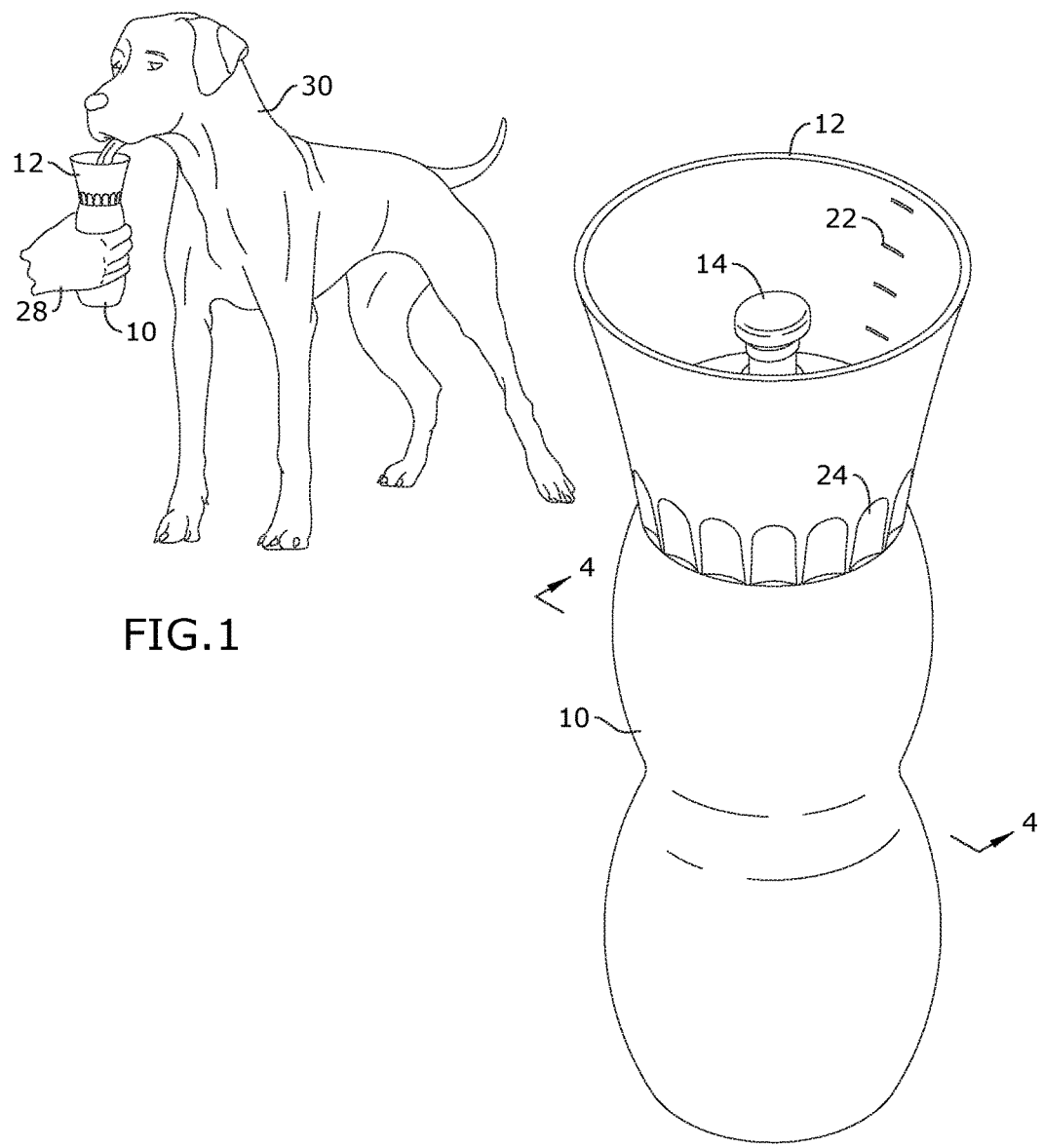
FIG. 1 is a perspective view of the pet drinking apparatus, shown in use.
FIG. 2 is a perspective view of the pet drinking apparatus.

In reference to FIG. 1, the pet water apparatus of the present invention is shown carried by a single hand 38 of a user to water their pet 30. The pet hydration apparatus includes a lower reservoir 10 for the containment of a hydrating liquid 36, such as water, for refreshing a pet 30. The hydrating liquid 36 is dispensed from the reservoir 10 via a bowl 12 coupled to the reservoir 10. The reservoir 10 may be formed of a resilient or flexible plastic material to permit the pet owner to squeeze the reservoir 10 so that the hydration fluid 36 is conveyed from the reservoir 10 to the bowl 12.

In reference to FIG. 2, the bowl 12 has top portion having an upwardly formed diverging sidewall and an arcuate bottom wall to contain a volume of hydrating fluid 36 therein for the pet to drink from. The sidewall may have a substantially conic or hemispherical section shape. The interior sidewall is provided with a plurality of volume markers 22 formed along an interior surface of the sidewall to provide the pet owner an indication of the volume of hydrating liquid 36 that is conveyed to the bowl 12. The plurality of volume markers 22 provide the pet owner the ability to determine an initial volume of hydrating fluid for the pet 30 to consume and a final volume indication 22 after the pet 30 has consumed the hydrating fluid 36 so that the pet owner can determine the actual volume of fluid 36 consumed by the pet 30 during one or more pet hydration events.

The arcuate bottom wall 27 extends with a generally convex upward curvature from its juncture with the interior sidewall of the bowl 12 to a centrally located spout 20. The spout 20 is formed as a generally tubular shape and extends upwardly from the arcuate bottom wall 27 of the bowl 12. The arcuate bottom wall 27 and the elevation of the spout 20 above the bottom surface of the bowl 12 ensures that a volume of hydrating fluid 36 is retained in the bowl 12 when the pet owner releases pressure from the reservoir 10. As such, the pet 30 may still be able to drink from the remaining hydrating fluid 36, regardless of whether the pet owner has pressure applied to the reservoir 10. The spout 20 and its elevation from the arcuate bottom surface of the bowl 12 may also be selected such that the bowl 12 may contain a desired volume of hydrating fluid 36 regardless of whether the pet owner is applying pressure to the reservoir 10.

Figure 3:
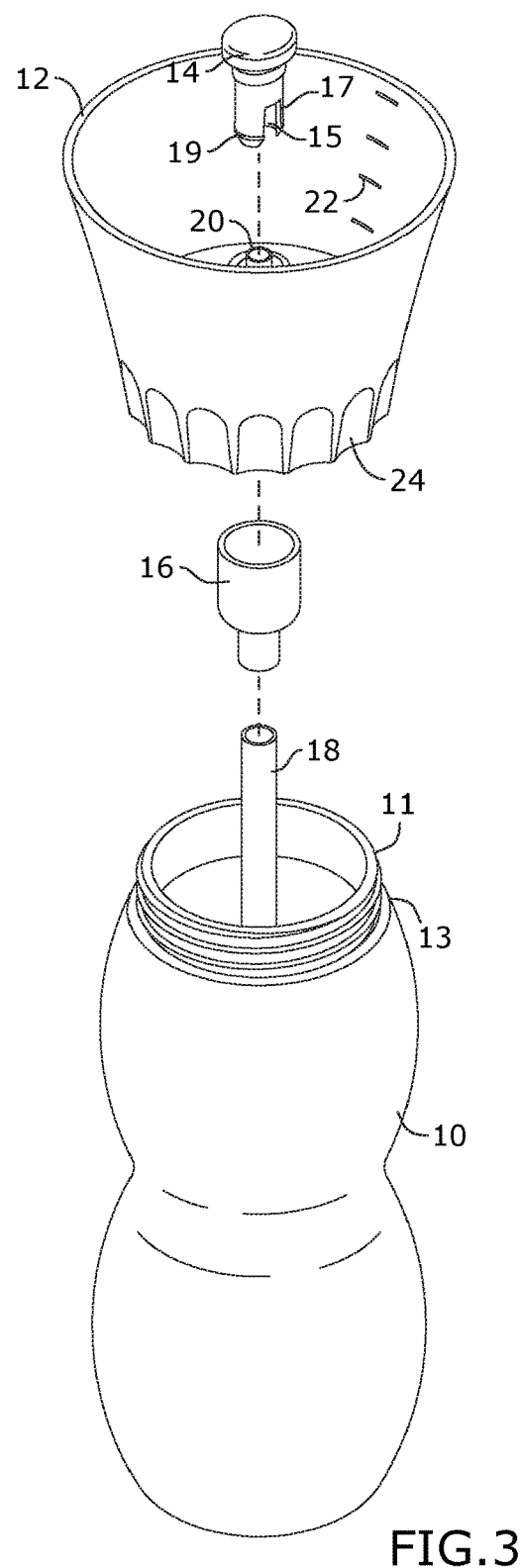
FIG. 3 is an exploded view of the pet drinking apparatus.

The bowl 12 is also provided with a valve 14 that is received within the spout 20 and operable by the user to control the flow of hydrating fluid 36 between the reservoir 10 and the bowl 12. As shown, the valve 14 has an outer body, an interior cavity and a slot 15 in communication with the interior cavity and an outer surface of the valve 14. The slots 15 are defined between a plurality of tabs 17 and a lip 19 is formed on the tab 17 for retention of the valve within the spout. With the valve 14, the bowl 12 may be filled with a desired volume of hydrating fluid 36 and the valve 14 closed to prevent the fluid 36 above the spout 20 from being drawn back into the reservoir 10 when the pet owner releases pressure on the reservoir 10. As seen in reference to FIG. 3 the valve 14 is shown removed in order to illustrate details of the valve 14 and the spout 20 formed in an elevated position relative to the arcuate bottom wall 27 of the bowl 10.

An exterior surface of the bowl 12 may also be provided with a plurality of grips 24 formed around the periphery of the bowl 12 at a base portion thereof to enable the pet owner to conveniently grip the bowl 12 while holding the watering apparatus for the pet or to remove the bowl 12 from the reservoir 10.

Figure 4:
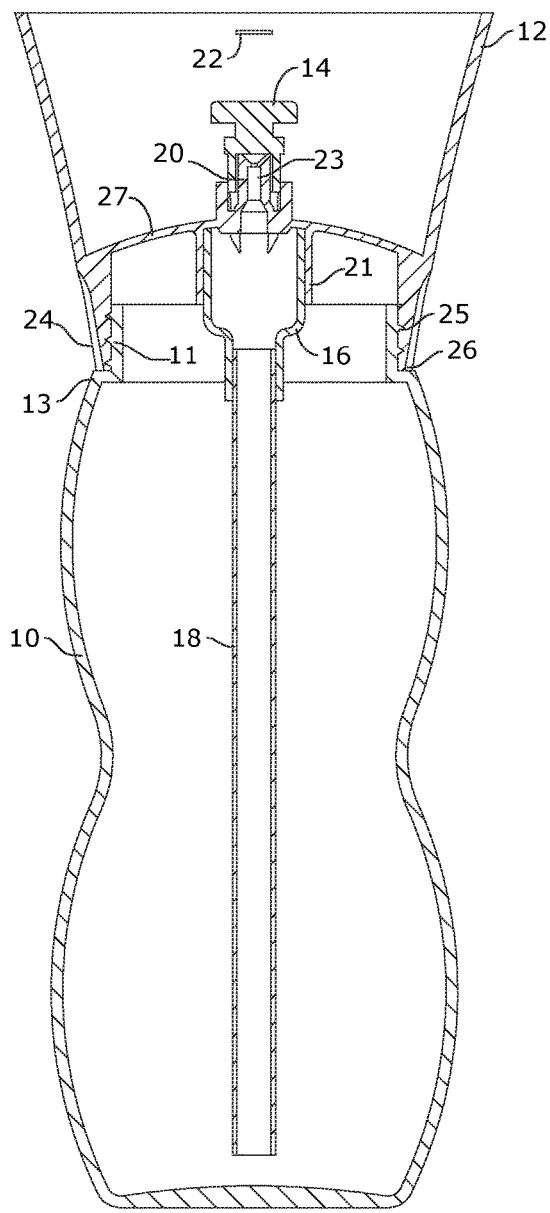
FIG. 4 is a section view of the pet drinking apparatus, taken along line 4-4 in FIG. 2.

A bottom exterior surface of the bowl 12 is provided an interior annular ring 21 generally coaxial with the spout 20, as seen in reference to FIG. 4. The annular ring 21 is adapted to receive an upper portion of a reducer 16 for coupling the spout 20 with the fluid in the reservoir 10. A bottom portion of the reducer 16 is dimensioned to receive a top end of a straw 18 that extends to a bottom portion of the reservoir 10 in order to convey the hydrating fluid 36 carried in the reservoir 10 to the bowl 12.

The top portion of the reservoir 10 includes a threaded throat portion 11 adapted to engage with a corresponding threaded portion 25 formed on an internal sidewall of a bottom portion of the bowl 12. The threaded throat portion 11 is surrounded by a shoulder 13 having a diameter that is slightly smaller than a top portion of the reservoir 10. The shoulder 13 is adapted for cooperative sealing engagement with a bottom annular rim 26 of the bowl 12.

Figure 5:
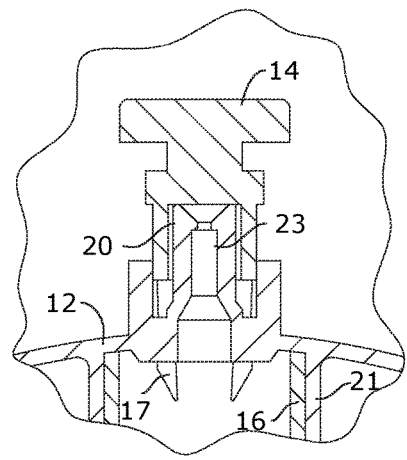
FIG. 5 is a detail section view of the pet drinking apparatus, with valve 14 in the closed position.
Figure 6:
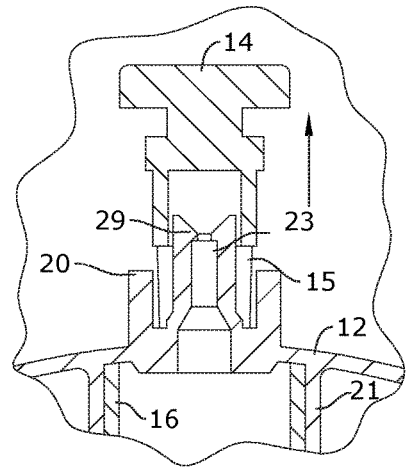
FIG. 6 is a detail section view of the pet drinking apparatus, with valve 14 in the open position.

As may be seen in reference to the detailed views of FIGS. 5 and 6, showing the operation of the valve 14 and relative to the spout 20, the valve 14 is selectively moveable between a closed position illustrated in reference to FIG. 5 and an open position shown in reference to FIG. 6. The interior cavity of the valve is carried on a central post 29 of the spout 20. In the closed position, the lips 19 of the tabs 17 engage with a bottom surface of the spout 20 to retain the valve in the closed position. When the valve 14 is pulled to the open position, the slots 15 are exposed above a top end of the spout 20 such that fluid 36 may flow through apertures 23 formed in the spout 20 and post 29 and be conveyed into the bowl 12.

Figure 7:
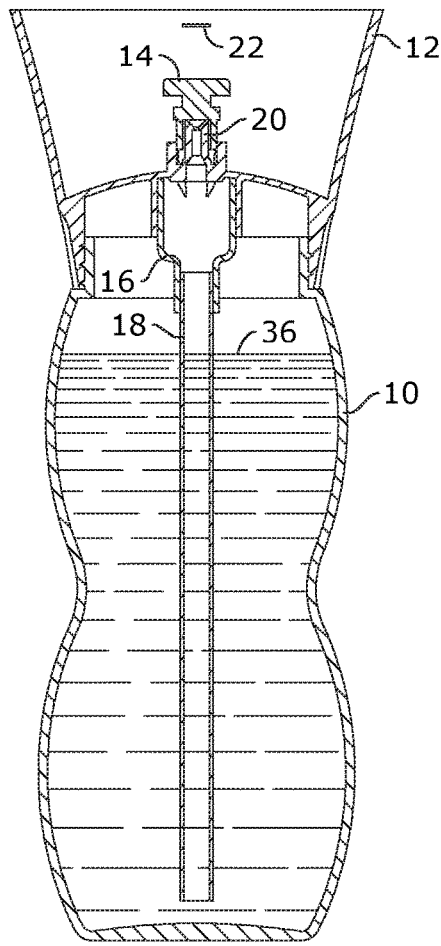
FIG. 7 is a section view of the pet drinking apparatus, illustrating bottle 10 filled with water 36, with valve 14 in the closed position.
Figure 8:
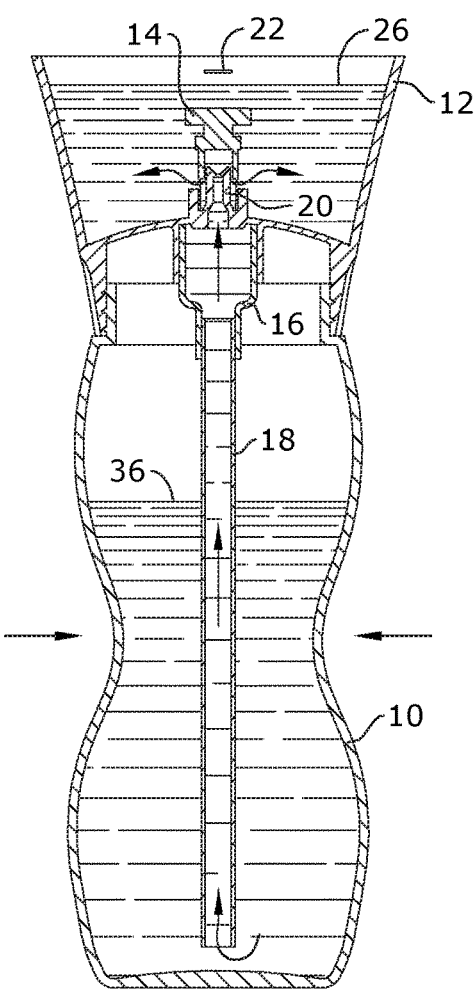
FIG. 8 is a section view of the invention, with valve 14 in the open position, illustrating the squeezing of bottle 10 to send water 36 through straw 18, spout 20, and valve 14 into bowl 12.

Operation of the pet watering apparatus of the present invention is illustrated in reference to FIGS. 7 and 8. As may be seen in FIG. 7, the reservoir 10 is filled to carry a desired volume of hydrating fluid 36. The valve 14 is placed in the closed position to sealingly retain the hydrating fluid 36 in the reservoir 10 to facilitate carriage of the watering apparatus without spillage or leaking of the liquid contents 36. As seen in FIG. 8, the valve 14 is moved to the open position. The reservoir 10 may then be squeezed to apply pressure to the hydrating fluid 36 carried within the reservoir 10, as indicated by the inwardly facing arrows. The hydrating fluid 36 is then conveyed to the bowl 12 via the straw 18, reducer 16 through the apertures 23 and slots 15 to fill the bowl 12. The valve 14 may then be closed to contain the hydrating fluid 36 within the bowl 12. Alternatively, the pet owner may squeeze the reservoir 10 to partially fill the bowl 12, release the pressure applied to the reservoir 10 and permit their pet to drink the remaining portion of the hydrating fluid 36 that is contained below the opening of the spout 20.

It should be understood, of course, that the foregoing relates to exemplary embodiments of the invention and that modifications may be made without departing from the spirit and scope of the invention as set forth in the following claims.

What is claimed is:

1. A pet hydrating apparatus, comprising:
   a liquid containment reservoir having a throat portion at a top end of the reservoir;
   a bowl having top portion with an upwardly formed diverging sidewall and an arcuate bottom wall adapted to contain a remaining volume of hydrating fluid therein, and a bottom portion adapted for sealing engagement with the throat portion;
   a spout defined in the arcuate bottom wall, in fluid communication with a bottom portion of the reservoir via a straw.

2. The apparatus of claim 1, further comprising:
   a valve adapted for cooperative engagement with the spout and operable between a closed liquid containing position and an open liquid conveying position.

3. The apparatus of claim 2, wherein the valve further comprises:
   an outer body,
   an interior cavity; and
   a plurality of slots extending from the interior cavity and the outer body, the slots defined by a plurality of tabs extending downwardly from the outer body.

4. The apparatus of claim 3, wherein the interior cavity of the valve is carried on a post extending upwardly from a central portion of the spout.

5. The apparatus of claim 4, wherein the tabs have a lip configured for cooperative engagement with a bottom surface of the spout to retain the valve in a closed position.

6. The apparatus of claim 5, wherein the spout has an annular rim defined in an interior surface of the spout cooperative engagement with the valve lip to retain the valve in an open position within the spout.

7. The apparatus of claim 1, wherein an upper opening of the spout is elevated with respect to an upper surface of the arcuate bottom wall within the bowl.

8. The apparatus of claim 7, wherein the reservoir is formed of a resilient material.

9. A pet hydration method, comprising:
providing a pet hydrating apparatus, comprising:
- a liquid containment reservoir having a throat portion at a top end of the reservoir;
- a bowl having top portion with an upwardly formed diverging sidewall and an arcuate bottom wall adapted to contain a remaining volume of hydrating fluid therein, and a bottom portion adapted for sealing engagement with the throat portion;
- a spout defined in the arcuate bottom wall, in fluid communication with a bottom portion of the reservoir via a straw. filling the reservoir with a hydration fluid.

10. The method of claim 9, further comprising:
squeezing to apply a pressure to the reservoir to at least partially fill the bowl with the hydration fluid.

11. The method of claim 10, further comprising:
presenting the bowl to the pet to drink.

12. The method of claim 10, further comprising:
releasing the pressure applied to the reservoir, such that the remaining volume of hydrating fluid is available for the pet to drink.

\* \* \* \* \*